United States Patent
Ide

(10) Patent No.: US 9,590,697 B2
(45) Date of Patent: Mar. 7, 2017

(54) DEVICE ENVIRONMENT DETERMINATION

(71) Applicant: Sony Corporation, Tokyo (JP)

(72) Inventor: Yuji Ide, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 49 days.

(21) Appl. No.: 14/674,675

(22) Filed: Mar. 31, 2015

(65) Prior Publication Data

US 2016/0294442 A1 Oct. 6, 2016

(51) Int. Cl.
| | | |
|---|---|---|
| *H04W 8/00* | (2009.01) | |
| *G06Q 30/02* | (2012.01) | |
| *H04W 76/02* | (2009.01) | |
| *H04B 3/48* | (2015.01) | |
| *H04W 24/08* | (2009.01) | |
| *H04B 1/3827* | (2015.01) | |

(52) U.S. Cl.
CPC ............. *H04B 3/48* (2013.01); *H04B 1/385* (2013.01); *H04W 24/08* (2013.01)

(58) Field of Classification Search
CPC .......... H04B 3/48; H04B 1/385; H04W 24/08
USPC .................................. 455/40, 552.1, 553.1
See application file for complete search history.

(56) References Cited

U.S. PATENT DOCUMENTS

| | | | | |
|---|---|---|---|---|
| 4,207,568 A | * | 6/1980 | MacLeod | H04B 13/02 340/852 |
| 2006/0286931 A1 | * | 12/2006 | Rhodes | H04B 13/02 455/40 |
| 2014/0051352 A1 | * | 2/2014 | Wolfe | H04B 13/02 455/40 |
| 2015/0194031 A1 | * | 7/2015 | Cutler | G08B 21/088 340/573.1 |

FOREIGN PATENT DOCUMENTS

JP 11-023704 1/1999

* cited by examiner

*Primary Examiner* — Sharad Rampuria
(74) *Attorney, Agent, or Firm* — Oblon, McClelland, Maier & Neustadt, L.L.P.

(57) ABSTRACT

Embodiments include systems of and methods for an electronic device having a radio communication processor connected to one or more transmission antennas, wherein each of the one or more transmission antennas are configured to transmit a signal; a receiving antenna connected to the radio communication processor and configured to receive the signal transmitted from the one or more transmission antennas; an attenuation measuring device configured to measure attenuation of the transmitted signal based on the signal received by the receiving antenna; and a controller configured by circuitry to determine a surrounding air or water environment of the electronic device based on the measured attenuation.

18 Claims, 10 Drawing Sheets

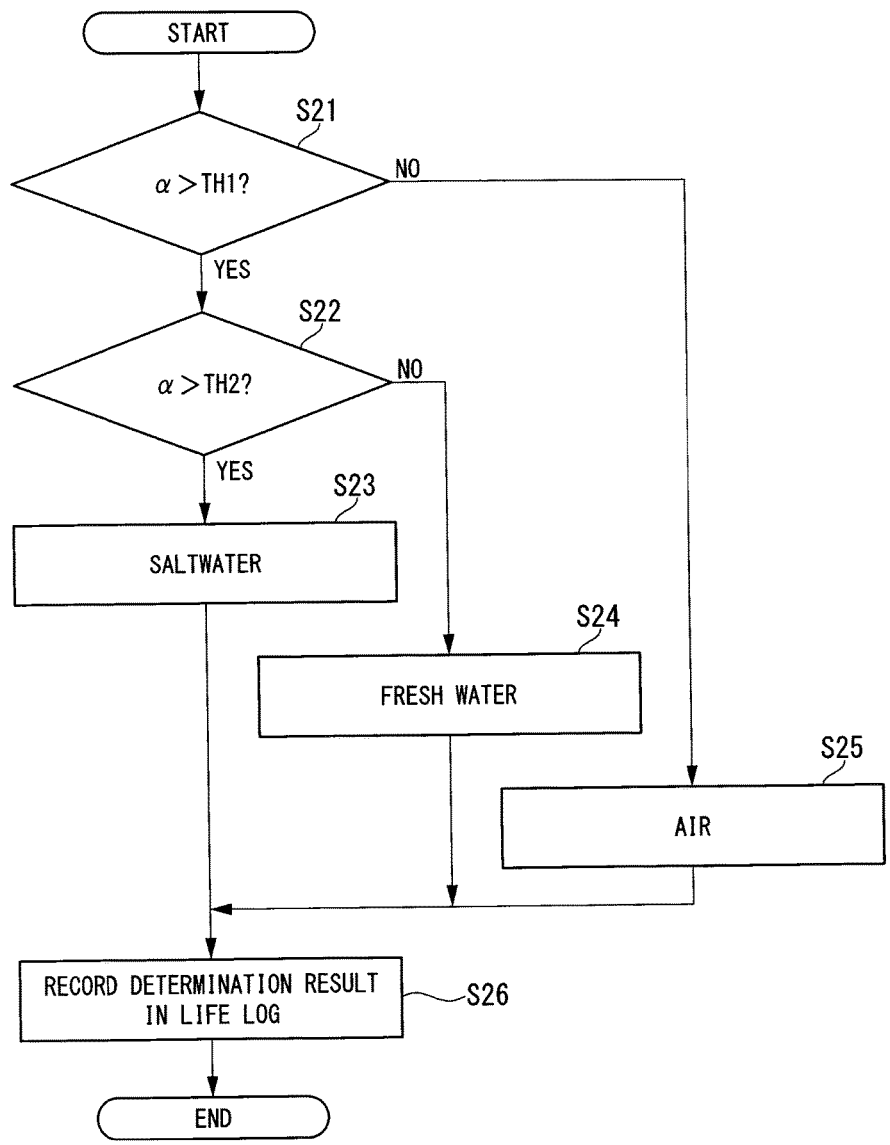

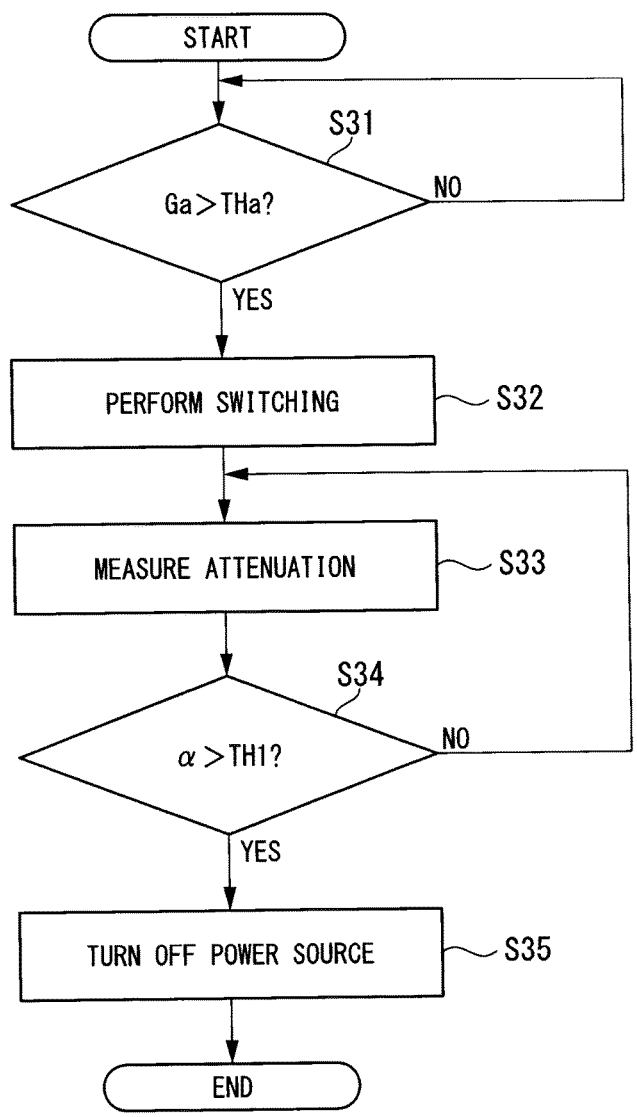

DEVICE ENVIRONMENT DETERMINATION

BACKGROUND OF THE INVENTION

Field of the Invention

Devices, systems, and methods for determining a device environment are described. In particular, an electronic system determines whether an electronic device is operating in an air environment or a water environment.

Description of the Related Art

A sensor of a smart phone or wearable electronic device can detect a present position and a surrounding state of the device. However, conventional electronic devices are not configured to determine whether the device is surrounded by water, such as an action of swimming or bathing. In addition, an electronic device without a waterproof function cannot be used in water. However, the electronic device is not made aware that its surroundings have changed to water, such as an accidental drop into water.

SUMMARY OF THE INVENTION

Embodiments include systems of and methods for an electronic device having a radio communication processor connected to one or more transmission antennas, wherein each of the one or more transmission antennas are configured to transmit a signal; a receiving antenna connected to the radio communication processor and configured to receive the signal transmitted from the one or more transmission antennas; an attenuation measuring device configured to measure attenuation of the transmitted signal based on the signal received by the receiving antenna; and a controller configured by circuitry to determine a surrounding air or water environment of the electronic device based on the measured attenuation.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 7-8 are exemplary algorithms for determining a surrounding environment of a user device according to an embodiment;

Referring now to the drawings, wherein like reference numerals designate identical or corresponding parts throughout the several views.

DETAILED DESCRIPTION OF THE PREFERRED EMBODIMENTS

Embodiments herein describe electronic systems, devices, and methods which determine the environment in which an electronic device is operating, such as air or water. The electronic device has at least one transmitting antenna and one reception antenna. An attenuation measuring device receives a radio wave transmitted by the transmitting antenna and received by the reception antenna. Based upon the measured attenuation, a controller of the electronic device determines whether the surrounding environment of the device is air or water.

Many electronic devices, such as a smart phone or a wearable device have a waterproof function. For example, a waterproof smart phone in the form of a wristwatch can be worn by a user while swimming or bathing. A waterproof smart device has one or more sensors which detect a present position and a surrounding state of the device. The smart device has a function to record the action of the user in possession of the device. However, the waterproof device does not have a function to determine whether the device is submerged in water, such as during swimming or bathing. In addition, an electronic device without a waterproof feature cannot be used in water since it is not protected. Therefore, it is desirable to determine whether an electronic device is surrounded in an air environment or a water environment, and to control the electronic device accordingly.

Figure 1:
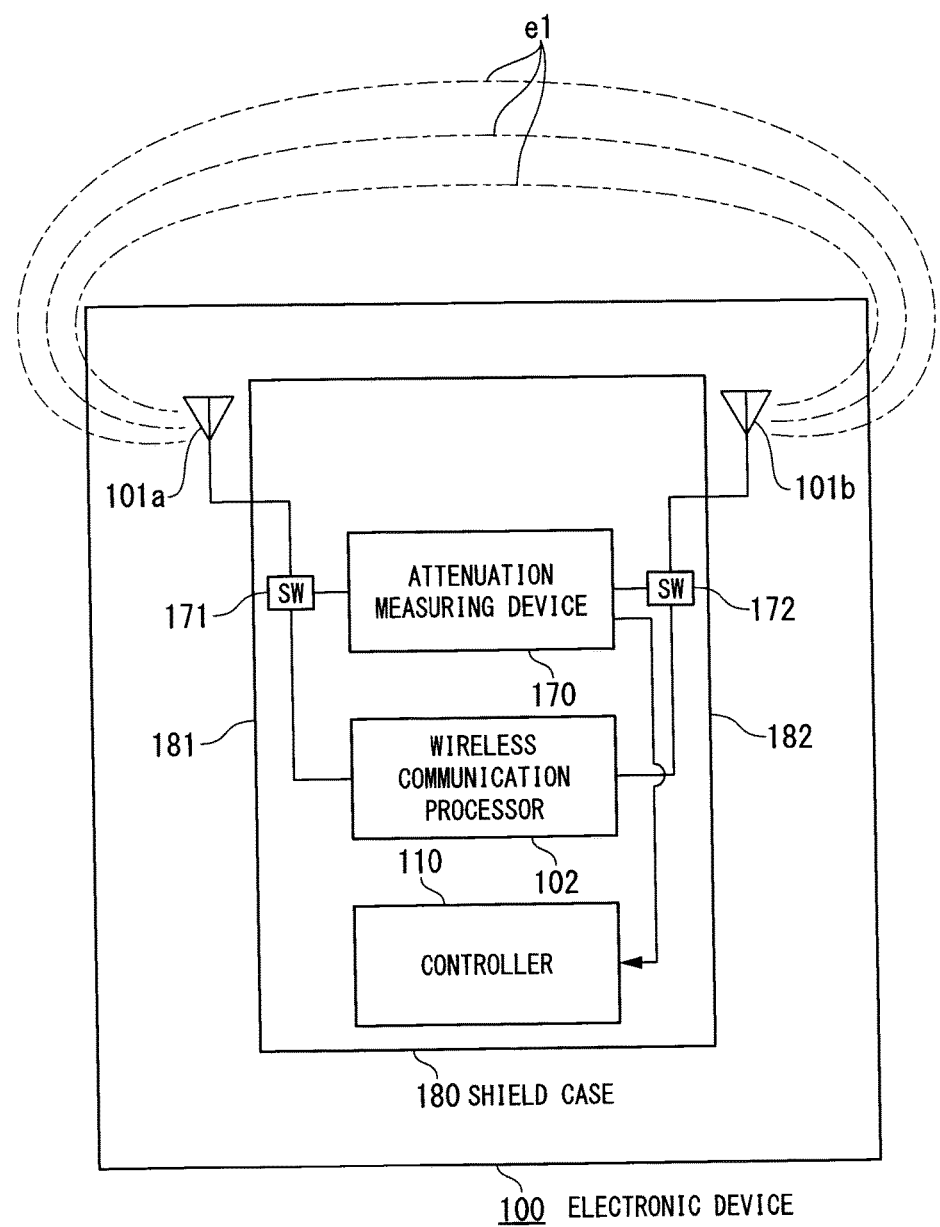
FIG. 1 is a block diagram of an exemplary electronic device according to an embodiment.

FIG. 1 is a block diagram of an electronic device 100 according to embodiments described herein. Electronic device 100 includes a wireless communication processor 102, which performs wireless communications using Multiple-Input/Multiple-Output (MIMO), for example. Different data can be transmitted simultaneously with a MIMO technique using multiple antennas connected to the wireless communication processor 102. Accordingly, electronic device 100 illustrates two antennas 101a and 101b. Each antenna 101a and 101b is connected to the wireless communication processor 102 through switches 171 and 172, respectively.

An attenuation measuring device 170 receives an electromagnetic wave e1 transmitted from antenna 101a and received at antenna 101b. An attenuation amount is measured from a ratio of the transmitting signal strength and the received signal strength. A shielding case 180 is arranged between antennas 101a and 101b. Therefore, electromagnetic waves transmitted from antenna 101a pass through the surroundings of the electronic device 100 and are subsequently received by antenna 101b.

Attenuation measuring device 170 transmits a signal from antenna 101a at a relatively high frequency, such as 2.4 GHz or 5 GHz. Attenuation data measured by attenuation measuring device 170 received by antenna 101b is forwarded to a controller 110 of the electronic device 100. Controller 110 compares the received attenuation data with a reference value to determine whether the surroundings of the electronic device 100 are an air environment or a water environment. When the attenuation amount is larger than a reference value, controller 110 determines the surroundings of the electronic device 100 are water. When the attenuation amount is smaller than the reference value, controller 110 determines the surroundings are air. Wireless communication processor 102 can control regular attenuation measurements during periods in which there are no wireless communications, for example, or when a pre-determined condition has been satisfied.

In FIG. 1, antennas 101a and 101b reside outside of the shielding case 180. Therefore, antenna 101b does not receive a signal component from antenna 101a which passes through the inside of electronic device 100. In an embodiment, shield members other than shielding case 180 can be included between antennas 101a and 101b to achieve the same objective of receiving signals only from outside of the electronic device 100.

Figure 2:
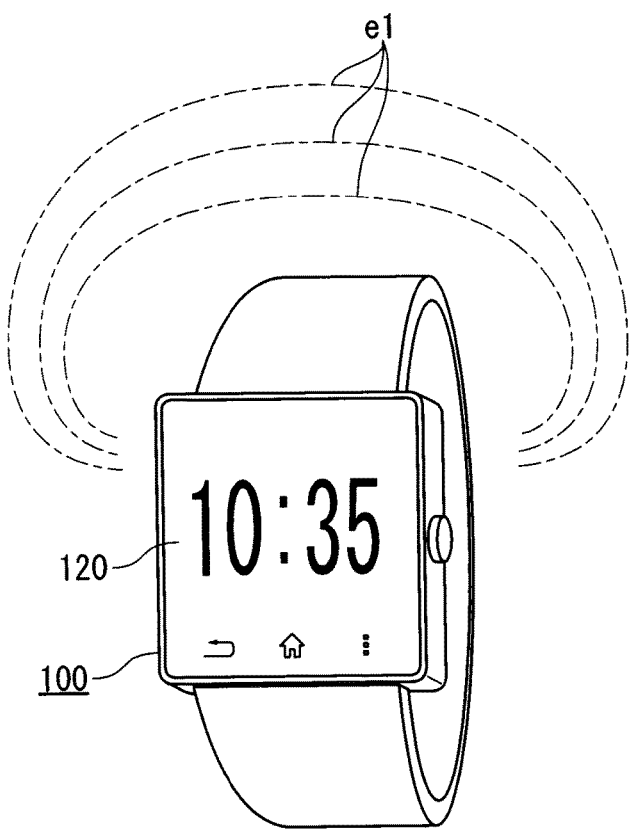
FIG. 2 illustrates a wearable electronic device according to an embodiment.

FIG. 2 illustrates an embodiment of a wearable electronic device 100 according to embodiments described herein. Electronic device 100 is in the form of a smart device wristwatch, also called a smart watch, which is waterproof. A display 120 is arranged on the face of the electronic device 100. Information, such as the time of day or email information is displayed on display 120. The attenuation measuring device 170 detects attenuation data of an electromagnetic wave e1 transmitted from antenna 101a and received by antenna 101b, as illustrated in FIG. 1. An attenuation amount is measured from a ratio of the transmitting signal strength and the received signal strength to determine the surroundings of the electronic device 100 as being air or water. Electronic device 100 can also be embodied as a head-mounted electronic device 100 or other smart phone or tablet device with a large-sized display.

Figure 3:
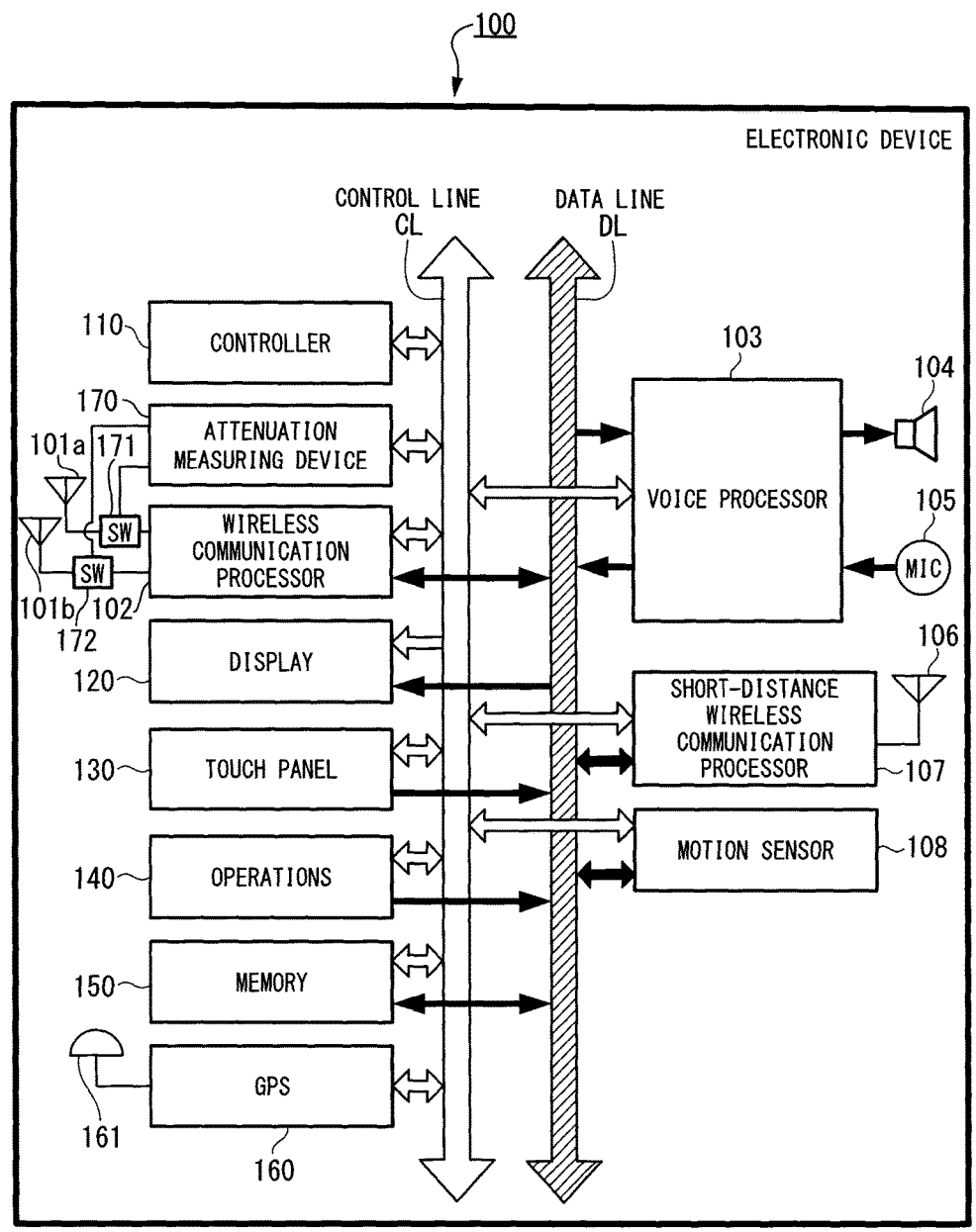
FIG. 3 is a block diagram illustrating an exemplary electronic device according to an embodiment.

FIG. 3 is a block diagram illustrating an exemplary electronic device 100 according to embodiments of the present disclosure. Electronic device 100 is illustrated, which can be a smart wearable device, for example. The skilled artisan will appreciate that the features described herein can be adapted to be implemented on many devices, such as a wristband, head-mounted, or body-wearable device.

A controller 110 controls each element in the electronic device 100 to perform functions related to communication control, audio signal processing, control for the audio signal processing, still and moving image processing and control, and other types of signal processing. The controller 110 can perform these functions by executing instructions stored in a memory 150. Alternatively or in addition to the local storage of memory, the functions can be executed using instructions stored on an external device accessed on a network or on a non-transitory computer readable medium.

The memory 150 includes, but is not limited to Read Only Memory (ROM), Random Access Memory (RAM), or a memory array including a combination of volatile and non-volatile memory units. The memory 150 can include a working memory by the controller 110 while executing the processes and algorithms of the present disclosure. Additionally, the memory 150 can include a mass storage.

Electronic device 100 includes one or more communication bus lines. Control data to and from the controller 110 can be transmitted through a control line CL. A data line DL can be used for transmission of voice data, display data, etc. via a voice processor 103.

Antenna 101a transmits electromagnetic wave signals via switch 171 for performing radio-based communication, such as various forms of cellular telephone communication through a wireless communication processor 102. The wireless communication processor 102 also controls communication of electromagnetic wave signals received at antenna 101b via switch 172.

A speaker 104 emits an audio signal corresponding to audio data supplied from the voice processor 103. A microphone 105 detects surrounding audio and converts the detected audio into an audio signal. The audio signal is output to the voice processor 103 for further processing. The voice processor 103 demodulates and/or decodes the audio data read from the memory 150 or audio data received by wireless communication processor 102 and/or a short-distance wireless communication processor 107. The short-distance communication processor 107 is connected to an antenna 106.

The exemplary electronic device 100 can also include a display 120 and operations 140, such as a touch panel and an operation key. The display 120 can be a Liquid Crystal Display (LCD), an organic electroluminescence display panel, or another display screen technology. In addition to displaying still and moving image data, the display 120 can display operational inputs, such as numbers or icons which can be used for control of the electronic device 100. The display 120 can additionally display a graphical user interface (GUI) for a user to control aspects of the electronic device 100 and/or other devices. Further, the display 120 can display characters and images received by the electronic device 100 and/or stored in the memory 150 or accessed from an external device on a network. For example, the electronic device 100 can access a network such as the Internet and display text and/or images transmitted from a Web server.

A touch panel 130 can include a physical touch panel display screen and a touch panel driver. The touch panel 130 can include one or more touch sensors for detecting an input operation on an operation surface of the touch panel display screen. The touch panel 130 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus can include a conductive material at least at the tip of the stylus such that the sensors included in the touch panel 130 can detect when the stylus approaches/contacts the operation surface of the touch panel display (similar to the case in which a finger is used for the touch operation).

In certain aspects of the present disclosure, the touch panel 130 can be disposed adjacent to the display 120 (e.g., laminated) or can be formed integrally with the display 120. For simplicity, the present disclosure assumes the touch panel 130 of operations 140 is formed integrally with the display 120 and therefore, examples discussed herein can describe touch operations 140 being performed on the surface of the display 120 rather than the touch panel 130. However, the skilled artisan will appreciate that this is not limiting.

For simplicity, the present disclosure assumes the touch panel 130 is a capacitance-type touch panel technology. However, it should be appreciated that aspects of the present disclosure can easily be applied to other touch panel types (e.g., resistance-type touch panels) with alternate structures. In certain aspects of the present disclosure, the touch panel 130 can include transparent electrode touch sensors arranged in the X-Y direction on the surface of transparent sensor glass.

The touch panel driver can be included in the touch panel of operations 140 for control processing related to the touch panel 130, such as scanning control. For example, the touch panel driver can scan each sensor in an electrostatic capacitance transparent electrode pattern in the X-direction and Y-direction and detect the electrostatic capacitance value of each sensor to determine when a touch operation is performed. The touch panel driver can output a coordinate and corresponding electrostatic capacitance value for each sensor. The touch panel driver can also output a sensor identifier that may be mapped to a coordinate on the touch panel display screen. Additionally, the touch panel driver and touch panel sensors can detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 130 can detect a position of a user's finger around an edge of the display panel (e.g., gripping a protective case that surrounds the display/touch panel). Signals can be transmitted by the touch panel driver, e.g. in response to a detection of a touch operation, in response to a query from another element based on timed data exchange, etc.

The touch panel of operations 140 and the display 120 can be surrounded by a protective casing, which can also enclose the other elements included in the electronic device 100. In certain embodiments, a position of the user's fingers on the protective casing (but not directly on the surface of the display 120) can be detected by the touch panel sensors. Accordingly, the controller 110 can perform display control processing described herein based on the detected position of the user's fingers gripping the casing. For example, an element in an interface can be moved to a new location within the interface (e.g., closer to one or more of the fingers) based on the detected finger position.

Further, in certain embodiments, the controller 110 can be configured to detect which hand is holding the electronic device 100, based on the detected finger position. For example, the touch panel sensors can detect a plurality of fingers on the left side of the electronic device 100 (e.g., on an edge of the display 120 or on the protective casing), and detect a single finger on the right side of the electronic device 100. In this exemplary scenario, the controller 110 can determine that the user is holding the electronic device 100 with his/her right hand because the detected grip pattern corresponds to an expected pattern when the electronic device 100 is held only with the right hand.

The operation key of operations 140 can include one or more buttons or similar external control elements, which can generate an operation signal based on a detected input by the user. In addition to outputs from the touch panel 130, these operation signals can be supplied to the controller 110 via the control line CL and/or the data line DL for performing related processing and control. In certain aspects of the present disclosure, the processing and/or functions associated with external buttons and the like can be performed by the controller 110 in response to an input operation on the touch panel display screen rather than the external button, key, etc. In this way, external buttons on the electronic device 100 can be eliminated in lieu of performing inputs via touch operations, thereby improving water-tightness.

Antenna 101a and antenna 101b can transmit and receive electromagnetic wave signals, respectively. An attenuation measuring device 170 outputs a transmitted signal for measuring an attenuation amount from antenna 101a. The attenuation measuring device 170 measures the attenuation amount from the received signal at antenna 101b. When the attenuation amount measuring device 170 measures an electromagnetic wave signal, switches 171 and 172 are switched from the wireless communication processor 102 to the attenuation measuring device 170. Switching of switches 171 and 172 is performed by the controller 110.

The short-distance wireless communication processor 107 can control the wireless communication performed to and from other external apparatuses via antenna 106. Bluetooth, IEEE 802.11, and near-field communication (NFC) are non-limiting examples of wireless communication protocols that can be used for inter-device communication via the short-distance wireless communication processor 107.

The electronic device 100 can include a motion sensor 108. The motion sensor 108 can detect features of motion (i.e., one or more movements) of the electronic device 100. For example, the motion sensor 108 can include an accelerometer to detect acceleration, a gyroscope to detect angular velocity, a geomagnetic sensor to detect direction, a geo-location sensor to detect location, etc., or a combination thereof to detect motion of the electronic device 100. In certain embodiments, the motion sensor 108 can generate a detection signal that includes data representing the detected motion. For example, the motion sensor 108 can determine a number of distinct movements in a motion (e.g., from start of the series of movements to a stop, within a predetermined time interval, etc.), a number of physical shocks on the electronic device 100 (e.g., a jarring, hitting, etc., of the user device), a speed and/or acceleration of the motion (instantaneous and/or temporal), or other motion features. The detected motion features can be included in the generated detection signal. The detection signal can be transmitted, e.g., to the controller 110, whereby further processing can be performed based on data included in the detection signal.

The motion sensor 108 can work in conjunction with a Global Positioning System (GPS) 160. The GPS 160 can detect the present position of the electronic device 100. The information of the present position detected by the GPS 160 is transmitted to the controller 110. An antenna 161 is connected to the GPS 160 for transmitting and receiving signals to and from a GPS satellite, respectively.

Figure 4:
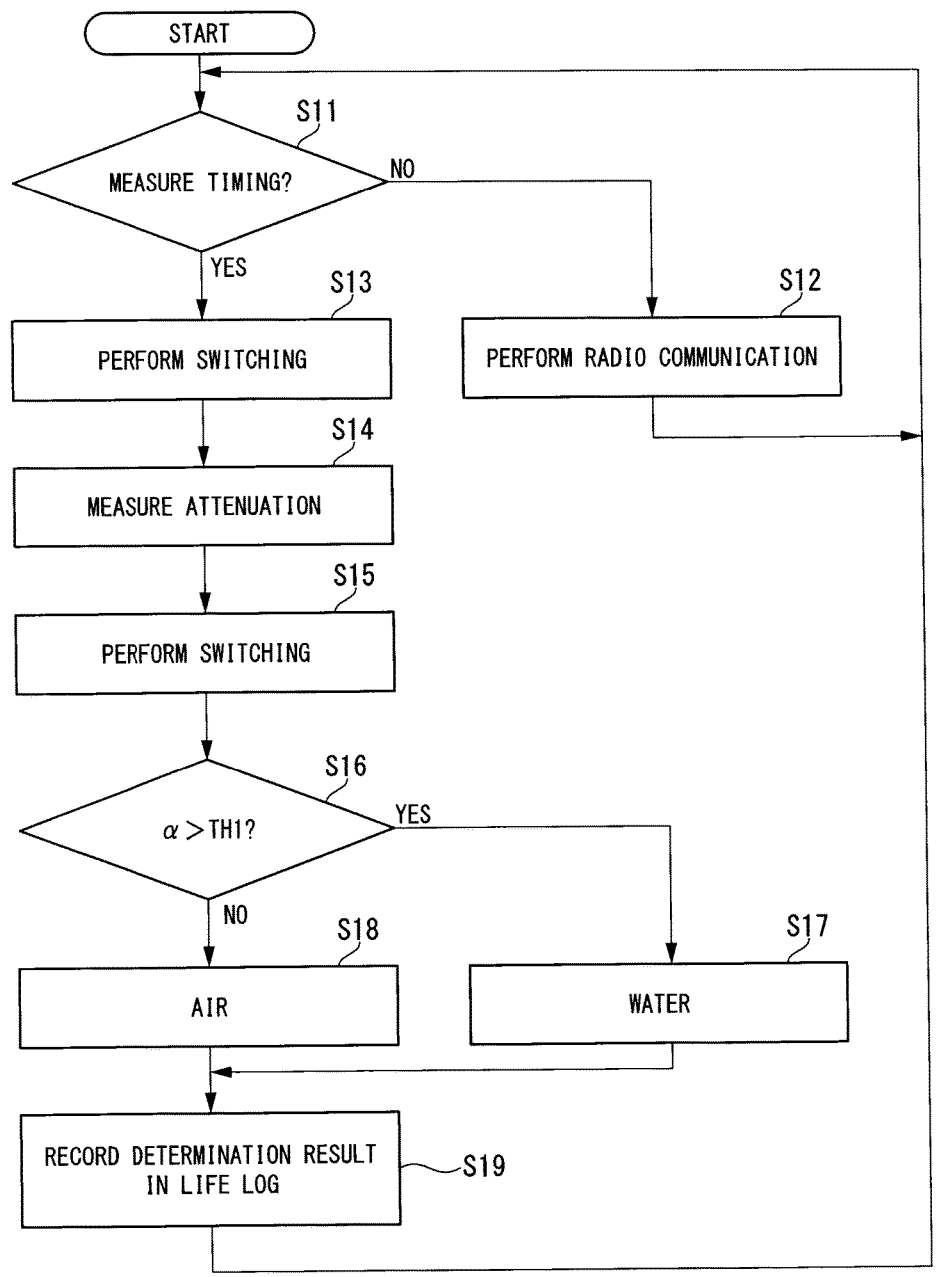
FIG. 4 is an exemplary algorithm for determining a surrounding environment of a user device according to an embodiment.

FIG. 4 is an exemplary algorithm for determining a surrounding environment, via the controller 110 of the electronic device 100. In step S11, the controller 110 determines whether it is time to measure the attenuation. If it is not time to measure the attenuation (a "no" decision in step S11), the process continues to step S12 where a radio communication is performed. When wireless communications in step S12 have stopped temporarily, the process returns to step S11. When it is time for an attenuation measurement (a "yes" decision in step S11), the process continues to step S13. In step S13, the controller 110 switches from operations of the wireless communication processor 102 to operations of the attenuation measuring device 170, via switches 171 and 172.

In step S14, the attenuation measuring device 170 transmits a signal from antenna 101a connected to switch 171. The specific code which identifies electronic device 100 is added to the radio signal transmitted from the attenuation measuring device 170. The attenuation measuring device 170 measures the attenuation amount of the signal received at antenna 101b connected to switch 172. The attenuation measuring device 170 removes and measures the signal component that was added to the specific code of the received signal.

In step S15, the controller 110 switches from operations of the attenuation measuring device 170 to operations of the wireless communication processor 102. In step S16, the controller 110 determines whether an attenuation amount α measured by the attenuation measuring device 170 exceeds a first threshold preset value TH1. When the attenuation amount α is greater than TH1 (a "yes" decision in step S16), the process continues to step S17 where it is determined that the ambient environment surrounding the electronic device 100 is water. When the attenuation amount α is not greater than TH1 (a "no" decision in step S16), the process continues to step S18 where it is determined that the ambient environment surrounding the electronic device 100 is air.

In step S19, the controller 110 records the ambient environment determined in step S17 or S18 as an entry in a life log or a user's action history. For example, when the controller 110 determines the ambient environment is water, a user's current action is recorded as swimming or bathing. The controller 110 determines in part the user is swimming or bathing by the present position determined by GPS 160 and by the motion of the electronic device 100 as detected by motion sensor 108. In another example, when the controller 110 determines the ambient environment is air, the controller 110 determines the actions upon the ground, such as walking or moving by car as determined by GPS 160, as well as the motion of the electronic device 100 detected by motion sensor 108. The controller 110 records the particular detected action(s) in the life log.

Figure 5:
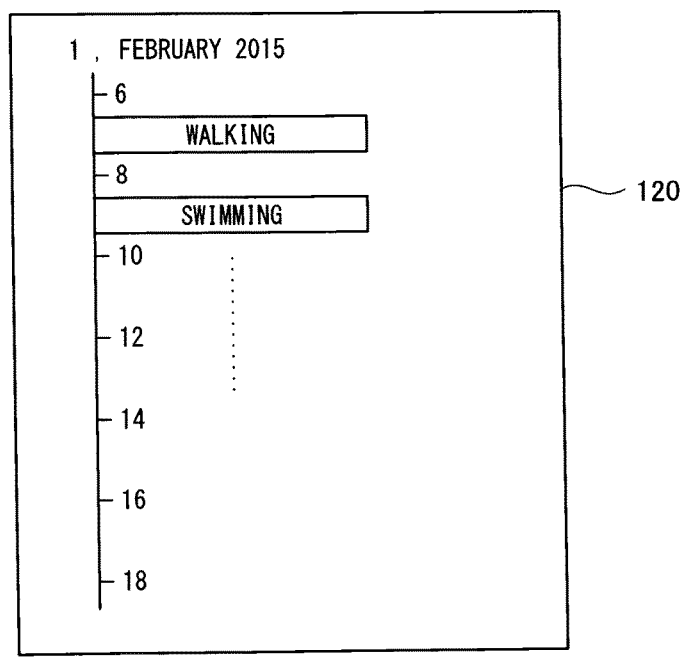
FIG. 5 illustrates an exemplary display of a life log according to an embodiment.

FIG. 5 illustrates an exemplary display 120 of a life log at a time in which the controller 110 executes an application of the life log, such as recording an action history. In the displayed example, actions between 6:00 to 18:00 of Feb. 1, 2015 are shown. Walking is recorded around 7:00 and swimming is recorded around 9:00.

Figure 6A:
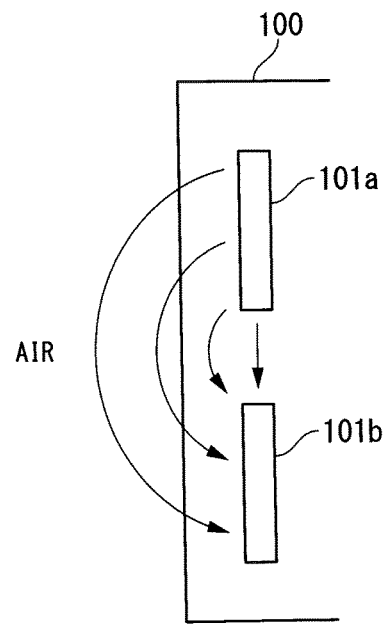
FIGS. 6A-6B illustrate attenuation amounts when the electronic device is surrounded by air and surrounded by water according to an embodiment.
Figure 6B:
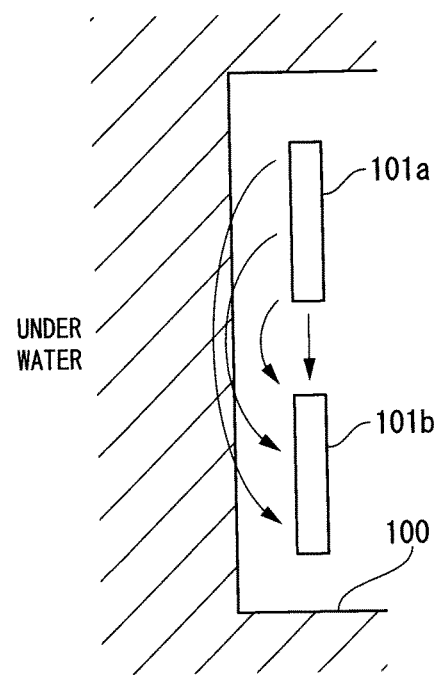

FIGS. 6A and 6B illustrate attenuation amounts when the electronic device 100 is surrounded by air and surrounded by water, respectively. The signal transmitted from antenna 101*a* of electronic device 100 is received by antenna 101*b*. An attenuation factor can be determined from a ratio of the strength of the transmitting signal to the strength of the received signal.

In FIG. 6A, when the device is surrounded by air, the difference in strength of the transmitting signal from antenna 101*a* and the received signal to antenna 101*b* is comparatively small. For example, the strength of the received signal fell by −15 dB from the transmitted signal when transmitted through air. In FIG. 6B, when the device is surrounded by water, the strength of the received signal fell by −10 dB from the strength of the transmitting signal. Therefore, the attenuation factor is different for a signal travelling through air versus water.

FIG. 7 is another exemplary algorithm for determining a surrounding environment, via the controller 110 of electronic device 100 by measuring an attenuation amount from attenuation measuring device 170. In FIG. 7, the same steps S11-S15 illustrated in FIG. 4 have already occurred. After steps S11-S15, the process in FIG. 7 begins at step S21 where the controller 110 determines whether an attenuation amount α measured by attenuation measuring device 170 exceeds a first preset threshold value TH1. TH1 can be the same value as used in FIG. 4, or it can be a different value. When the attenuation amount α is not greater than TH1 (a "no" decision in step S21), the process continues to step S25, where the surroundings of electronic device 100 are determined to be air. When the attenuation amount α is greater than TH1 (a "yes" decision in step S21), the process continues to step S22.

In step S22, the controller 110 determines whether the attenuation amount α measured by the attenuation measuring device 170 is greater than a second preset threshold value TH2, where the value of TH2 is higher than the value of TH1. When the attenuation amount α is not greater than TH2 (a "no" decision in step S22), the process continues to step S24, where the surroundings of electronic device 100 are determined to be fresh water. When the attenuation amount α is greater than TH2 (a "yes" decision in step S22), the process continues to step S23, where the surroundings of electronic device 100 are determined to be saltwater, such as seawater.

In step S26, the controller 110 records the ambient environment determined from steps S23, S24, or S25 as a life log event. For example, when the controller 110 determines the electronic device 100 is surrounded by saltwater, the controller 110 can record the current user's action as swimming in the sea. In addition, the depth of the water in which the electronic device 100 is submerged can be recorded from the value of an atmospheric pressure sensor. When the controller 110 determines the electronic device 100 is submerged in water other than seawater, the controller 110 can determine the user is swimming in a pool, for example.

FIG. 8 illustrates another exemplary algorithm for determining a surrounding environment, via the controller 110 of electronic device 100 by measuring an attenuation amount from attenuation measuring device 170. The attenuation amount is measured when the acceleration detected by motion sensor 108 is an abnormal value. The process illustrated by FIG. 8 can be performed in combination with the processes of FIG. 4 or FIG. 7. The process illustrated in FIG. 8 can be suitable when the electronic device 100 is not waterproof.

In step S31, the controller 110 determines whether an acceleration Ga detected by motion sensor 108 exceeds a threshold value THa. Threshold value THa is a value for distinguishing a state in which electronic device 100 is or is not freely falling. If the acceleration Ga is not greater than THa (a "no" decision in step S31), the process waits until the acceleration Ga does exceed the threshold value THa. When the acceleration Ga exceeds THa (a "yes" decision in step S31), the process moves to step S32. In step S32, the controller 110 switches operations from the wireless communication processor 102 to operations of the attenuation measuring device 170 via switches 171 and 172.

In step S33, the attenuation measuring device 170 transmits a radio signal from antenna 101*a* via switch 171. The specific code which identifies electronic device 100 is combined with the transmitted signal. The attenuation measuring device 170 removes the signal component attributed to the specific code from the received signal at antenna 101*b* to measure the attenuation amount received. The attenuation measuring device 170 measures the attenuation signal component from the signal received at antenna 101*b* via switch 172.

In step S34, the controller 110 determines whether an attenuation amount α measured by attenuation measuring device 170 exceeds a first preset threshold value TH1. The first preset threshold value TH1 in step S34 can be the same value or a different value from step S16 illustrated in FIG. 4. When the attenuation amount α is not greater than TH1 (a "no" decision in step S34) the process returns to step S33 and measures the attenuation amount. When the attenuation amount α is greater than TH1 (a "yes" decision in step S34), the process continues to step S35, where the power source is turned off.

The process illustrated in FIG. 8 is performed when the electronic device 100 is dropped into water, which terminates the power supply to the electronic device 100. The electronic device 100 will no longer attempt to operate in water because the power supply has been turned off.

Figure 9:
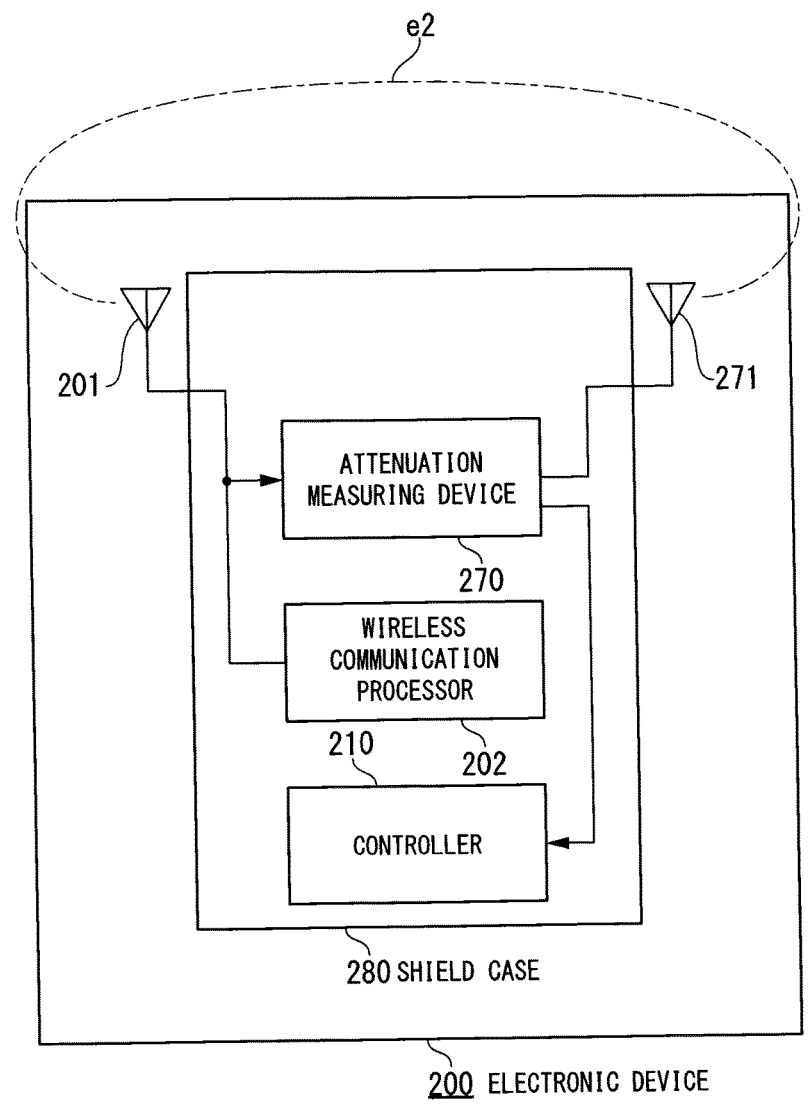
FIG. 9 is a block diagram of an exemplary electronic device according to an embodiment.

FIG. 9 is a block diagram of an exemplary electronic device 200 according to embodiments described herein. Antenna 271 is connected to an attenuation measuring device 270. Antenna 271 receives an electromagnetic wave e2 transmitted from antenna 201, also connected to the attenuation measuring device 270. Antenna 201 can include one or more antennas. The attenuation measuring device 270 is also connected to a wireless communication processor 202. A shielding case 280 is arranged between antenna 201 and antenna 271.

The attenuation measuring device 270 compares a signal transmitted from antenna 201 with a signal received by antenna 271 to measure an attenuation amount of the received signal. The attenuation measuring device 270 also detects a specific code associated with the electronic device 200 included in the transmitted signal, and detects the signal component transmitted by the wireless communication processor 202. The attenuation amount measured by the attenuation measuring device 270 is forwarded to the controller 210. In the electronic device 200, the attenuation measuring device 270 measures an attenuation amount communicated by the wireless communication processor 202.

Figure 10A:
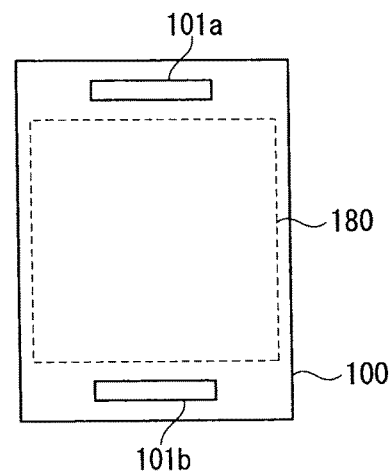
FIGS. 10A-10C illustrate various antenna arrangements according to an embodiment.
Figure 10B:
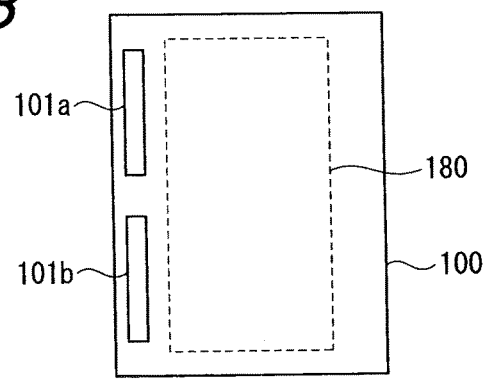
Figure 10C:
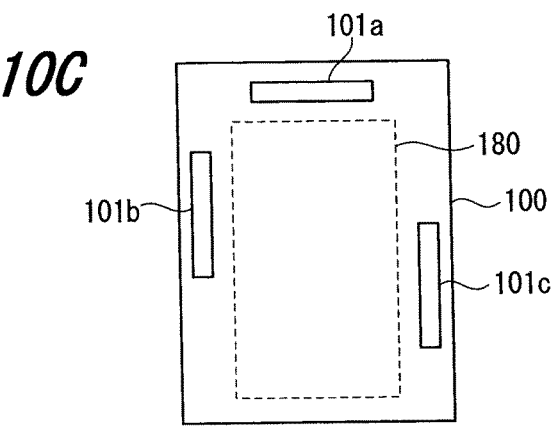

FIGS. 10A-10C illustrate various antenna arrangements. FIG. 10A illustrates electronic device 100 having antenna 101a on an upper side and antenna 101b on a lower side of the electronic device 100. A shielding case 180 is arranged between antenna 101a and antenna 101b.

FIG. 10B illustrates electronic device 100 having antenna 101a and 101b along a left side of the electronic device 100. Shielding case 180 is arranged adjacent to antennas 101a and 101b.

FIG. 10C illustrates electronic device 100 having antenna 101a along an upper side, antenna 101b along an upper left side, and antenna 101c along a lower right side of electronic device 100. Shielding case 180 resides in an interior position to antennas 101a, 101b, and 101c. In an embodiment, when measuring an attenuation amount, any of the three antennas 101a, 101b, and 101c can be a transmitting antenna or a receiving antenna.

Numerous modifications and variations of the present invention are possible in light of the above teachings. The embodiments described with reference to the drawings may be practiced individually or in any combination thereof. It is therefore to be understood that within the scope of the appended claims, the embodiments may be practiced otherwise than as specifically described herein.

The functions, processes, and algorithms described herein may be performed in hardware or software executed by hardware, including computer processors and/or programmable processing circuits configured to execute program code and/or computer instructions to execute the functions, processes, and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It is noted that, as used in the specification and the appended claims, the singular forms "a," "an," and "the" include plural referents unless the context clearly dictates otherwise.

The above disclosure also encompasses the embodiments noted below.

(1) An electronic device comprising: a radio communication processor connected to one or more transmission antennas, wherein each of the one or more transmission antennas are configured to transmit a signal; a receiving antenna connected to the radio communication processor and configured to receive the signal transmitted from the one or more transmission antennas; an attenuation measuring device configured to measure attenuation of the transmitted signal based on the signal received by the receiving antenna; and a controller configured by circuitry to determine a surrounding air or water environment of the electronic device based on the measured attenuation.

(2) The electronic device according to (1), further comprising: two transmission antennas, wherein one of the two transmission antennas is converted to a receiving antenna.

(3) The electronic device according to (1) or (2), further comprising: a shield arranged between the one or more transmission antennas and the receiving antenna.

(4) The electronic device according to any one of (1) to (3), wherein the shield is configured to prevent a transmitted signal from going through the electronic device.

(5) The electronic device according to any one of (1) to (4), wherein the shield is configured to direct the transmitted signal around an exterior portion of the electronic device to the receiving antenna.

(6) The electronic device according to any one of (1) to (5), wherein the controller records the determined surrounding of the electronic device in a user's log.

(7) The electronic device according to any one of (1) to (6), wherein the controller is further configured to determine whether the surrounding of the electronic device is saltwater or fresh water, based on the measured attenuation.

(8) The electronic device according to any one of (1) to (7), wherein the controller is configured to determine the surrounding air or water environment from the measured attenuation when a detected acceleration of the electronic device is greater than a predetermined level.

(9) The electronic device according to any one of (1) to (8), wherein the controller is further configured to turn off a power source of the electronic device when the surrounding environment is determined to be water.

(10) The electronic device according to any one of (1) to (9), wherein the electronic device includes one of a wrist smartwatch, a wrist smartphone, or a head-mounted smartphone.

(11) The electronic device according to any one of (1) to (10), wherein the controller determines the surrounding is an air environment when a measured attenuation is less than a preset first threshold level.

(12) The electronic device according to any one of (1) to (11), wherein the controller determines the surrounding is a water environment when the measured attenuation is greater than the preset first threshold level.

(13) The electronic device according to any one of (1) to (12), wherein the controller determines the surrounding is a saltwater environment when the measured attenuation is greater than a preset second threshold level, wherein the preset second threshold level is greater than the preset first threshold level.

(14) The electronic device according to any one of (1) to (13), further comprising: a first switch configured to switch between transmitting a communication from the radio communication processor and transmitting a signal from the attenuation measuring device, via the controller; and a second switch configured to switch between receiving the communication at the radio communication processor and receiving the signal at the attenuation measuring device, via the controller.

(15) The electronic device according to any one of (1) to (14), further comprising: one or more of a Guidance Positioning System (GPS), a voice processor, or a motion sensor.

(16) A method of determining a surrounding environment of an electronic device, comprising: transmitting a signal from a transmitting antenna of the electronic device; measuring an attenuation of the signal from the transmitting antenna, via an attenuation measuring device, based in part on the signal received at a receiving antenna; and determining the surrounding environment of the electronic device as air or water, based on the measured attenuation.

(17) The method according (16), further comprising: determining an air surrounding environment when the measured attenuation is less than a first preset threshold level.

(18) The method according to any one of (16) to (17), further comprising: determining a water surrounding environment when the measured attenuation is greater than the first preset threshold level.

(19) The method according to any one of (16) to (18), further comprising: determining a saltwater surrounding environment when the measured attenuation is greater than a second preset threshold level, wherein the second preset threshold level is greater than the first preset threshold level.

(20) The method according to any one of (16) to (19), further comprising: turning off a power source of the electronic device when a water surrounding environment is determined.

The invention claimed is:
1. An electronic device, comprising:
 a radio communication processor connected to one or more transmission antennas, wherein each of the one or more transmission antennas are configured to transmit a signal;
 a receiving antenna connected to the radio communication processor and configured to receive the signal transmitted from the one or more transmission antennas;
 an attenuation measuring device configured to measure attenuation of the transmitted signal based on the signal received by the receiving antenna; and
 a controller configured by circuitry to determine a surrounding air or water environment of the electronic device based on the measured attenuation, wherein the controller determines the surrounding is an air environment when a measured attenuation is less than a preset first threshold level.
2. The electronic device of claim 1, further comprising: two transmission antennas, wherein one of the two transmission antennas is converted to a receiving antenna.
3. The electronic device of claim 1, further comprising:
 a shield arranged between the one or more transmission antennas and the receiving antenna.

4. The electronic device of claim 3, wherein the shield is configured to prevent a transmitted signal from going through the electronic device.
5. The electronic device of claim 4, wherein the shield is configured to direct the transmitted signal around an exterior portion of the electronic device to the receiving antenna.
6. The electronic device of claim 1, wherein the controller records the determined surrounding of the electronic device in a user's log.
7. The electronic device of claim 1, wherein the controller is further configured to determine whether the surrounding of the electronic device is saltwater or fresh water, based on the measured attenuation.
8. The electronic device of claim 1, wherein the controller is configured to determine the surrounding air or water environment from the measured attenuation when a detected acceleration of the electronic device is greater than a predetermined level.
9. The electronic device of claim 8, wherein the controller is further configured to turn off a power source of the electronic device when the surrounding environment is determined to be water.
10. The electronic device of claim 1, wherein the electronic device includes one of a wrist smartwatch, a wrist smartphone, or a head-mounted smartphone.
11. The electronic device of claim 1, wherein the controller determines the surrounding is a water environment when the measured attenuation is greater than the preset first threshold level.
12. The electronic device of claim 11, wherein the controller determines the surrounding is a saltwater environment when the measured attenuation is greater than a preset second threshold level, wherein the preset second threshold level is greater than the preset first threshold level.
13. The electronic device of claim 1, further comprising:
 a first switch configured to switch between transmitting a communication from the radio communication processor and transmitting a signal from the attenuation measuring device, via the controller; and
 a second switch configured to switch between receiving the communication at the radio communication processor and receiving the signal at the attenuation measuring device, via the controller.
14. The electronic device of claim 1, further comprising:
 one or more of a Guidance Positioning System (GPS), a voice processor, or a motion sensor.
15. A method of determining a surrounding environment of an electronic device, comprising:
 transmitting a signal from a transmitting antenna of the electronic device;
 measuring an attenuation of the signal from the transmitting antenna, via an attenuation measuring device, based in part on the signal received at a receiving antenna; and
 determining the surrounding environment of the electronic device as air or water, based on the measured attenuation, wherein the determining includes determining an air surrounding environment when the measured attenuation is less than a first preset threshold level.
16. The method of claim 15, further comprising:
 determining a water surrounding environment when the measured attenuation is greater than the first preset threshold level.
17. The method of claim 16, further comprising:
 determining a saltwater surrounding environment when the measured attenuation is greater than a second preset threshold level, wherein the second preset threshold level is greater than the first preset threshold level.

18. The method of claim 15, further comprising:
turning off a power source of the electronic device when a water surrounding environment is determined.

\* \* \* \* \*